US007001541B2

(12) United States Patent
Dhar

(10) Patent No.: US 7,001,541 B2
(45) Date of Patent: Feb. 21, 2006

(54) METHOD FOR FORMING MULTIPLY PATTERNED OPTICAL ARTICLES

(75) Inventor: Lisa Dhar, New Providence, NJ (US)

(73) Assignee: InPhase Technologies, Inc., Longmont, CO (US)

( * ) Notice: Subject to any disclaimer, the term of this patent is extended or adjusted under 35 U.S.C. 154(b) by 480 days.

(21) Appl. No.: 10/236,802

(22) Filed: Sep. 5, 2002

(65) Prior Publication Data

US 2003/0062638 A1 Apr. 3, 2003

Related U.S. Application Data

(60) Provisional application No. 60/322,302, filed on Sep. 14, 2001.

(51) Int. Cl.
*B29D 11/00* (2006.01)
*B29C 35/08* (2006.01)

(52) U.S. Cl. .................. 264/1.27; 264/1.31; 264/1.32; 264/1.34; 264/1.37

(58) Field of Classification Search ............... 264/1.27, 264/1.31, 1.32, 1.34, 1.37
See application file for complete search history.

(56) References Cited

U.S. PATENT DOCUMENTS

| | | | |
|---|---|---|---|
| 3,417,454 A | 12/1968 | Beasley | |
| 3,631,411 A | 12/1971 | Kosonocky et al. | |
| 3,905,778 A | 9/1975 | Pearson | |
| 3,932,148 A | 1/1976 | Krewalk, Sr. | |
| 4,183,545 A | 1/1980 | Daly | |
| 4,220,491 A | 9/1980 | Metcalf et al. | |
| 4,470,856 A | 9/1984 | Little et al. | |
| 4,506,184 A | 3/1985 | Siddall | |
| 4,537,827 A | 8/1985 | Little et al. | |
| 4,579,616 A | 4/1986 | Windischmann et al. | |
| 4,637,904 A * | 1/1987 | Rounds | 264/1.38 |
| 4,737,824 A | 4/1988 | Sakai et al. | |
| 4,986,641 A | 1/1991 | Braat | |
| 5,054,683 A | 10/1991 | Haisma et al. | |
| 5,131,968 A | 7/1992 | Wells et al. | |
| 5,160,560 A | 11/1992 | Welkowsky et al. | |
| 5,259,926 A * | 11/1993 | Kuwabara et al. | 216/54 |
| 5,326,420 A | 7/1994 | Vinouze et al. | |
| 5,393,365 A | 2/1995 | Smith | |

(Continued)

FOREIGN PATENT DOCUMENTS

EP 0 683 511 11/1995

(Continued)

OTHER PUBLICATIONS

Brinke et al. (1994). "The Thermal Characterization of Multi-Component Systems by Enthalpy Relaxation," *Thermochimica Acta.* 238:75-98.

(Continued)

*Primary Examiner*—Suzanne E. McDowell
(74) *Attorney, Agent, or Firm*—Morrison & Foerster LLP

(57) ABSTRACT

The present invention provides a solution to the needs described above through a method for forming multiply patterned optical articles. The method comprises providing a micromold having a pre-patterned surface structure, disposing a photorecording medium comprising a matrix precursor and a photoactive monomer on a holder surface, moving the micromold to the photorecording medium on the holder surface such that the pre-patterned surface structure contacts the photorecording medium, wherein the photorecording medium conforms to the pre-patterned surface structure of the micromold, at least partially curing the photorecording medium adherent while the micromold pre-patterned surface structure contacts the photorecording medium, and further patterning the photorecording medium by irradiating the photorecording medium with laser light to polymerize the photoactive monomer.

13 Claims, 2 Drawing Sheets

U.S. PATENT DOCUMENTS

| | | | | |
|---|---|---|---|---|
| 5,433,911 | A | 7/1995 | Ozimek et al. | |
| 5,515,167 | A | 5/1996 | Ledger et al. | |
| 5,670,009 | A | 9/1997 | Tarn et al. | |
| 5,760,864 | A | 6/1998 | Yamada et al. | |
| 5,795,430 | A | 8/1998 | Beeteson et al. | |
| 5,932,045 | A | 8/1999 | Campbell et al. | |
| 6,033,604 | A * | 3/2000 | Lundin et al. | 264/1.24 |
| 6,075,626 | A | 6/2000 | Mizutani et al. | |
| 6,103,454 | A | 8/2000 | Dhar et al. | |
| 6,156,415 | A | 12/2000 | Campbell et al. | |
| 6,252,686 | B1 | 6/2001 | Ando | |
| 6,482,551 | B1 * | 11/2002 | Dhar et al. | 430/1 |
| 6,660,192 | B1 * | 12/2003 | Kim et al. | 264/1.27 |
| 2003/0044577 | A1 | 3/2003 | Dhar et al. | |

FOREIGN PATENT DOCUMENTS

| | | |
|---|---|---|
| WO | WO 95/11521 | 4/1995 |
| WO | WO 03/018309 | 3/2003 |

OTHER PUBLICATIONS

Goodman, J. W. ed., (1968). *Introduction to Fourier Optics*, McGraw-Hill Book Company, Table of Contents, 5 pages.

Hecht, E. ed., (1987). *Optics*, Second Edition, Addison-Wesley Publishing Company, Table of Contents, 4 pages.

Hesselink, L. et al. (1993). "Optical Memories Implemented with Photorefractive Media," *Optical and Quantum Electronics*, 25:S611-S661.

IBM Technical Disclosure Bulletin, (1989). "Device for Planarizing Structured Surfaces," 32(5A):402-403.

Kerker, M. ed., (1969). *The Scattering of Light and Other Electromagnetic Radiation*, Academic Press, Table of Contents, 4 pages.

Krause, S. (1989). "Compatible Polymers" *In Polymer Handbook*. J. Brandup and E.H. Immergut, eds., 3rd Ed., Wiley-Interscience Publication, John Wiley & Sons. pp. VI 347-370.

Landau, L. D. and Lifshitz, E. M. eds., (1986). *Theory of Elasticity: Volume 7 of Course of Theoretical Physics*, Third English Edition, Pergamon Press, p. 44.

Li, H-Y. S. and Psaltis, D. (1994). "Three-Dimensional Holographic Disks," *Applied Optics* 33(17):3764-3774.

Murali, R. and Eisenberg, J. (1988). "Ionic Miscibility Enhancement in Poly(tetraflouroethylene)/Poly (ethylacrylate) Blends. I. Dynamic Mechanical Studies," *J. Polym. Sci., Part B: Polym. Phys.* 26(7):1385-1396.

Natansohn, A. et al. (1988). "Miscibilty Enhancement in Polymers Via Ionic Interactions: Dynamic Mechanical and NMR Studies," *Makromol. Chem. Macromol. Symp.* 16:175-193.

Olabisi, O. et al. eds., (1979). *Polymer-Polymer Miscibility*, Academic Press, Table of Contents.

Pappu, S.V. (1990). "Holographic Memories; A Critical Review," *Int. Journal of Optoelectronics* 5(3):251-292.

Piton, M. C. and Natansohn, A. (1995). "Charge-Transfer Interactions in Copolymer Blends. 1. Poly[(N-ethylcarbazol-3-yl)methyl Methacrylate-*co*-Methyl Methacrylate] Blended with Poly[2-[(3,5-Dinitrobenzoy) oxy]ethyl Methacrylate-*co*-Methyl Methacrylate], " *Macromolecules* 28:1197-1202.

Piton, M. C. and Natansohn, A. (1995). "Charge-Transfer Interactions on Copolymer Blends. 3.Poly[(N-ethylcarbazol-3-yl)methyl methacrylate-co-styrene] Blended with Poly[2-[(3,5-Dinitrobenzoyl)oxy]ethyl Methacrylate-co-methyl methacrylate]," *Macromolecules* 28(5):1605-1608.

Psaltis, D. and Mok, F. (1995). "Holographic Memories," *Scientific American*. pp. 70-76.

Pu, A. et al. (1994). "A New Method for Holographic Data Storage in Photopolymer Films," *Proceedings from IEEE/IEOS Symposium*. pp. 433-435.

Quake, S. R. and Scherer, A. (2000). "From Micro-to Nanofabrication with Soft Materials," *Science*. 290:1536-1540.

Robeson, L. M. (1982). "Miscible Polymer Blends: Review with Emphasis on Recent Advances." *MMI. Press Symp. Ser.* 2:177-211.

Taylor-Smith, R. E. and Register, R. A. (1993). "Probing Interdomain Mixing Effects Via Specific Interactions: A Model System Approach," *Macromolecules* 26(11):2802-2809.

Utracki, L. A. eds. (1989). *Polymer Alloys and Blends: Thermodynamics and Rheology*, Hanser Publishers, Table of Contents, pp. 4.

Xia, Y. et al. (1996). "Complex Optical Surfaces Formed by Replica Molding Against Elastomeric Masters," *Science*, 273:347-349.

Xia, Y. and Whitesides, G.M. (1998). "Soft Lithography," *Angewandte Chemie-International Edition in English*, 37 (5):551-575.

Zhou, Z-L. and Eisenberg, A. (1983). "Ionomeric Blends. II. Compatibility and Dynamic Mechanical Properties of Sulfonated cis-1,4-Polyisoprenes and Styrene/4-Vinylpyridine Copolymer Blends,"*Journal of Polymer: Sci., Polym. Phys. Ed.*, 21(4):595-603.

* cited by examiner

MASTER

MASTER

METHOD FOR FORMING MULTIPLY PATTERNED OPTICAL ARTICLES

CROSS REFERENCE TO RELATED APPLICATIONS

This application claims the benefit of U.S. provisional application No. 60/322,302, filed Sep. 14, 2001, which is incorporated by reference herein in its entirety.

TECHNICAL FIELD

The present invention relates to the general field of optical articles. More specifically the invention relates to a method for forming multiply patterned optical articles.

BACKGROUND

Replica molding is discussed in "Complex Optical Surfaces Formed by Replica Molding Against Elastomeric Masters", by Younan Xia, et al, the contents of which are herein incorporated by reference. Complex, optically functional surfaces in organic polymers can be fabricated by replicating relief structures present on the surface of an elastomeric master with an ultraviolet or thermally curable organic polymer, while the master is deformed by compression, bending, or stretching. The procedure discussed was used to fabricating surfaces with complex, micrometer and submicrometer-scale patterns, including (i) diffraction gratings with periods smaller than the original grating; (ii) chirped, blazed diffraction gratings (where the period of a chirped grating changes continuously with position) on planar and curved surfaces; and (iii) patterned microfeatures on the surfaces of approximately hemispherical objects (for example, an optical surface similar to a fly's eye). These topologically complex, micropatterned surfaces are difficult to fabricate with other techniques. Xia discusses that replica molding of an organic polymer (for example, polyurethane, polymethylmethacrylate, or epoxy) against an elastomeric master [made, for example, of poly (dimethylsiloxane) (PDMS)], while that master is deformed, provides a strategy for the fabrication of complex micropatterns on surfaces. Deformation of the elastomeric master, followed by replication of the structures present on the surface of the deformed master in the rigid polymer, provides a route to structures that would be impractically difficult to generate through other procedures. Molding and embossing of organic polymers against right masters is used to manufacture optically functional microstructures such as diffraction gratings.

Replica molding to form diffractive optics is also discussed in "From Micro- to Nanofabrication with Soft Materials", by Stephen R. Quake, et al, which is herein incorporated by reference. Quake discusses the use of soft materials such as elastomers in replica molding. According to Quake, advantages of replica molding include the fact that resolution is determined by the mold feature size, not by the optical diffraction limit. The molds are reusable, and thus their cost and fabrication difficulty do not factor substantially into the final cost of a mass-produced device. The molds can be produced with electron beam lithography, a time-consuming and expensive process that has the ability to make nanometer-scale features. Quake discusses the fabrication of diffractive optical lenses, beam splitters, and other optical elements using the replication molding step for high-fidelity pattern definition of optical nanostructures.

In "Soft Lithography", by Younan Xia, et al., which is hereby incorporated by reference, Xia discusses the use of soft lithography as a non-photolithographic strategy based on self-assembly and replica molding for carrying out micro- and nanofabrication. In soft lithography, an elastomeric stamp with patterned relief structures on its surface is used to generate patterns and structures with feature sizes ranging from 30 nm to 100 m. Replica molding techniques are discussed, which allow duplication of three-dimensional topologies in a single step; it also enables faithful duplication of complex structures in the master in multiple copies with nanometer resolution in a simple, reliable, and inexpensive way. Replica molding against a rigid mold with an appropriate material (usually a thermoplastic polymer) has been used for the mass-production of a wide range of structured surfaces such as compact disks, diffraction gratings, and holograms. Xia discloses extending the capability of this procedure by molding against elastomeric PDMS molds rather than against rigid molds; the use of elastomers makes it easier to release small, fragile structures.

Prior art systems do not discuss the possibly of multiply patterning optical articles as taught by the invention. Thus, there has been a need for improved methods and systems for multiply patterning optical articles.

SUMMARY OF THE INVENTION

The present invention provides a solution to the needs described above through a method for forming multiply patterned optical articles. The method comprises providing a micromold having a pre-patterned surface structure, disposing a photorecording medium comprising a matrix precursor and a photoactive monomer on a holder surface, moving the micromold to the photorecording medium on the holder surface such that the pre-patterned surface structure contacts the photorecording medium, wherein the photorecording medium conforms to the pre-patterned surface structure of the micromold, at least partially curing the photorecording medium adherent while the micromold pre-patterned surface structure contacts the photorecording medium, and further patterning the photorecording medium by irradiating the photorecording medium with laser light to polymerize the photoactive monomer.

DESCRIPTION OF THE DRAWINGS

The features and advantages of the method of the present invention will be apparent from the following description in which.

DETAILED DESCRIPTION OF THE PREFERRED EMBODIMENTS

The present invention provides a solution to the needs described above through a method for forming multiply patterned optical articles. The invention utilizes molding techniques to create optical articles and also utilizes photopatterning techniques to create further optical articles.

Still other embodiments of the present invention will become apparent to those skilled in the art from the following detailed description, wherein is shown and described only the embodiments of the invention by way of illustration of the best modes contemplated for carrying out the invention. As will be realized, the invention is capable of modification in various obvious aspects, all without departing from the spirit and scope of the present invention. Accordingly, the drawings and detailed description are to be regarded as illustrative in nature and not restrictive.

An embodiment of the method of the present invention is described by reference to FIGS. 1A–1F.

Figure 1A:
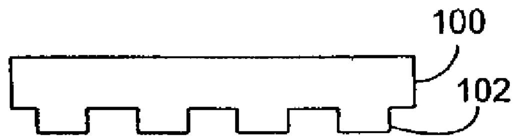
FIGS. 1A–1F illustrate the process of the present invention for forming multiply patterned articles.

FIGS. 1A–1F illustrate an embodiment of the method of the present invention for multiply patterning optical articles from a photorecording medium. FIG. 1A illustrates a mold master 100 containing a mold pattern 102.

Mold master 100 can be formed utilizing a variety of techniques. In one embodiment, a mask pattern is utilized to prepare a patterned silicon wafer utilizing photolithography and silicon etching techniques. For example, a mask pattern can be transferred to silicon wafers using photolithography with reactive ion etching. The silicon wafer can then be used to produce mold masters made of elastomers such as polydimethylsiloxane (PDMS). An elastomeric master is created by pouring an elastomer precursor, such as unpolymerized PDMS onto the patterned silicon wafer and allowing it to cure. After curing, flexible PDMS elastomer master is peeled off of the silicon wafer, which can then be reused to make more PDMS masters. After curing and removal, the PDMS master possessed a negative relief of the final desired geometry. For example, mold master 100 can be formed so that it can be used to replicate optical waveguide structures. The thickness of the PDMS master is typically 50 micrometers, with surface features as small as 2 micrometers. Preparation of elastomeric masters can be prepared as described in "Complex Optical Surfaces Formed by Replica Molding Against Elastomeric Masters", by Younan Xia, et al, "From Micro- to Nanofabrication with Soft Materials", by Stephen R. Quake, et al, and "Soft Lithography", by Younan Xia, et al, which are hereby incorporated by reference in their entirety. Although PDMS has been exemplified for making the elastomeric master, other elastomer materials can be employed. Preferred elastomers are those to which the photorecording medium that is desired to be molded does not substantially adhere.

In alternative embodiments, the mold master 100 is a hard mold as opposed to a soft mold such as a PDMS mold. The mold master 100 may be constructed of materials such as silicon, metal or glass. Methods of constructing such hard molds include applying a photoresist to a silicon wafer, exposing certain areas via a mask pattern, etching away the unexposed photoresist, and metalizing the exposed photoresist to create a metal replica of the mask pattern.

Figure 1B:
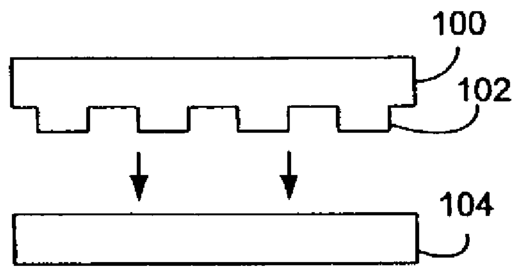
Figure 1C:
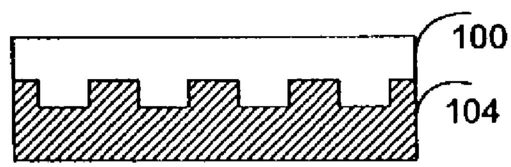
Figure 1D:
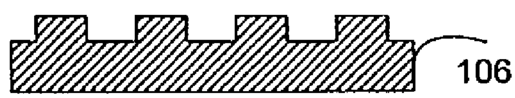

Referring to FIG. 1B, the first patterning of a photorecording medium is shown. The mold master 100 with mold pattern 102 is brought into conformal contact with a liquid photorecording medium 104. Photorecording medium 104 is optimized so that it can be multiply patterned. Referring to FIG. 1C, the photorecording medium 104 conforms with the mold pattern 102 of mold master 100. While the photorecording medium 104 is in conformity with the mold master 100, it is hardened so that the patterned surface structures are retained when the mold master 100 is removed. The prepolymer and/or monomer solution in the photorecording medium can be hardened by addition of a polymerization catalyst, by crosslinking induced by heating or by U.V. irradiation or similar known methods. In an embodiment of the invention, the photorecording medium is at least partially cured to form a 3-dimensional crosslinked polymer matrix formed by mercaptan epoxy step polymerization. Referring to FIG. 1D, the mold master 100 is then peeled off, leaving a patterned photorecording medium 106 containing the desired structure.

The present invention allows for multiple patterning of the photorecording medium to form optical articles. Most patterning technologies allow for effective patterning of a material only once. An embodiment of the invention utilizes a photorecording medium whereby a reaction polymerizing the photoactive monomer is independent from the mercaptan epoxy step polymerization reaction.

Figure 1E:
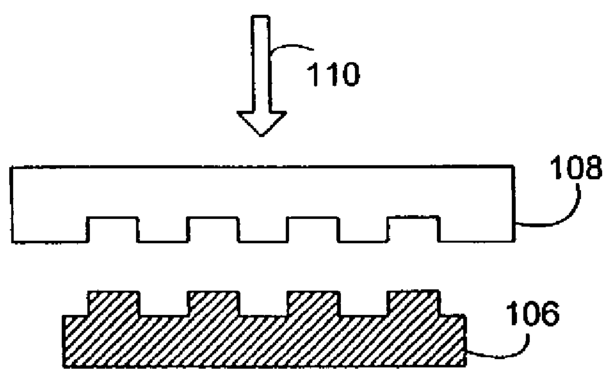
Figure 1F:
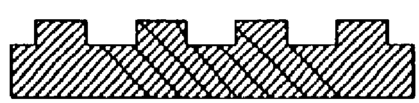

Referring to FIG. 1E, an optical phase grating 108 is used in a photolithographic is placed near the previously patterned photorecording medium 106. A UV light beam 110 from a laser is passed through the grating 108, which has its face containing the grating striations facing the previously patterned photorecording medium 106. The light beam 110 is phase modulated spatially and is diffracted by the grating 108 to form an interference pattern. The generated interference pattern is directed to the previously patterned photorecording medium 106 resulting in the formation of a Bragg grating in the previously patterned photorecording medium 106, shown in FIG. 1E. The Bragg gratings can be used utilized in a variety of structures such as optical filters, multiplexers, demultiplexers, holographic lenses, or other phase structures. One or more lenses may be used to focus the generated interference pattern onto the previously patterned photorecording medium 106. Irradiation of the previously patterned photorecording medium 106 polymerizes the photoactive monomer, where the photoactive monomer polymerization is independent from the mercaptan epoxy step polymerization reaction.

Optical phase grating 108 is also referred to as a phase grating mask or phase mask. It can be made using methods well known to those of ordinary skill in the art in the fields of holography and diffraction gratings. Optical phase grating 108 is comprised of a surface-relief structure fabricated in a high quality fused silica flat transparent to the laser beam. The purpose of the surface relief structures is to vary the phase of the incident light beam 110 in a spatially periodic or nearly periodic manner. The energy distribution into the various diffractive orders (e.g., zeroeth-order, first order, etc.) of the phase grating 108 depends on the design of the surface relief structures. The shape of the periodic surface-relief pattern of the phase grating preferably approximates a square wave in profile. Alternatively, the shape can be that of a sinusoidal wave. The period of the phase grating 108 is generally the same as the period of the desired Bragg grating in the photorecording medium 106. Optical phase grating 108 may be, for example, a transmission surface grating or a reflection surface grating.

The optical phase grating 108 is positioned near photorecording medium 106 a separation sufficient to establish in the photorecording medium 106 the required interference pattern. Bragg gratings with a length longer than the phase mask can be manufactured using a step and repeat process. In this process, the phase grating 108 is translated a distance corresponding to the fringe pattern length such that subsequent written gratings are in phase with previously written gratings.

The period of the grating generally ranges from approximately 200 nm to 500 nm.

An advantage of Bragg grating photolithography utilizing phase gratings is it provides a means for the fabrication of several devices in parallel, permits the use of proven, high-fluence, industrial laser sources and simplifies manufacturing alignment procedures.

In an alternative embodiment, a light beam is split into two beams utilizing a beam splitter, and the two light beams are intersected within the photorecording medium in order to create an interference grating within the photorecording medium.

Figure 2A:
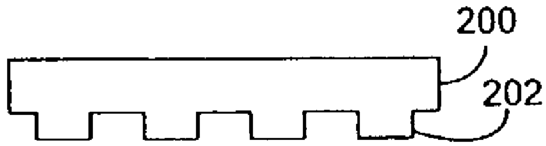
FIGS. 2A–2E illustrate a further process of the present invention for forming multiply patterned articles.
Figure 2B:
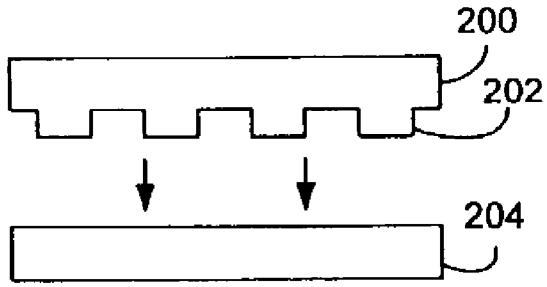
Figure 2C:
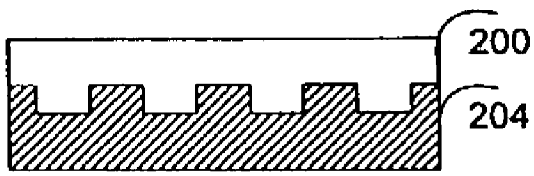
Figure 2D:
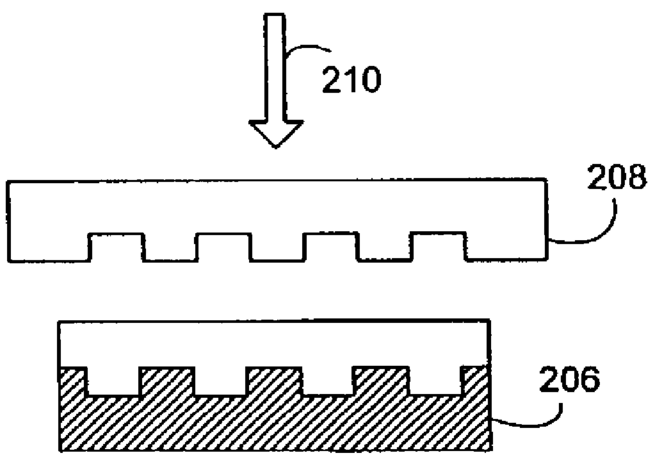
Figure 2E:
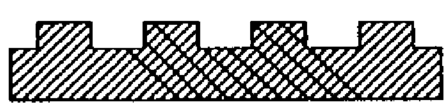

In an alternative embodiment, the mold master is not removed from the photopolymer material prior to photopatterning with an optical phase grating. Referring to FIG. 2A, a mold master 200 containing a mold pattern 202 is illustrated. Referring to FIG. 2B, the first patterning of a photorecording medium is shown. The mold master 200 with mold pattern 202 is brought into conformal contact with a liquid photorecording medium 204. Photorecording medium 204 is optimized so that it can be multiply patterned. Referring to FIG. 2C, the photorecording medium 204 conforms with the mold pattern 202 of mold master 200. While the photorecording medium 204 is in conformity with the mold master 200, it is hardened so that the patterned surface structures are retained when the mold master 200 is later removed. The prepolymer and/or monomer solution in the photorecording medium can be hardened by addition of a polymerization catalyst, by crosslinking induced by heating or by U.V. irradiation or similar known methods. In this embodiment, mold master 200 is not removed prior to photopatterning. An optical phase grating 208 is placed near the mold master in contact with the crosslinked patterned photopolymer beam. A UV light beam from a suitable laser is passed through the grating 208, which has its face containing the grating striations facing the previously patterned photopolymer 206. The light beam 210 is phase modulated spatially and is diffracted by the grating 208 to form an interference pattern. The generated interference pattern is directed through the mold master to the previously patterned photopolymer 206 resulting in the formation of a Bragg grating in the previously patterned photorecording medium 206, as illustrated in FIG. 2E. One or more lenses may be used to focus the generated interference pattern onto the previously patterned photopolymer. In this embodiment, mold master is transparent to the wavelength of the photopatterning light being utilized, UV light in the present example. Mold masters comprising materials such as glass or elastomers can be utilized.

The present invention thus provides a simple method for multiply patterning photorecording mediums. The resulting structures can include, for example, optical filters, multiplexers, demultiplexers, or other phase structures embedded within an optical waveguide. The combination of replica molding processes and photopatterning processes allows for easier fabrication of articles with embedded structures. In addition, the combination of replica molding processes and photopatterning processes yield high performance, high reliability, and low cost devices.

In general the improved method provide herein can employ any photorecording medium with sufficient mechanical robustness to support a molded structure while still capable of photopatterning after the molding process. In a preferred embodiment, a photopolymer such as that described in U.S. Pat. No. 6,103,454, which is hereby incorporated by reference, is utilized.

The photopolymer medium utilized by the invention is formed by steps including mixing a matrix precursor and a photoactive monomer, and curing the mixture to form the matrix in situ. The matrix precursor and photoactive monomer are selected such that (a) the reaction by which the matrix precursor is polymerized during the cure of the replica molding patterning is independent from the reaction by which the photoactive monomer will be polymerized during the photopatterning, and (b) the matrix polymer and the polymer resulting from polymerization of the photoactive monomer (the photopolymer) are compatible with each other. The matrix is considered to be formed when the photopolymer medium, i.e., the matrix material plus the photoactive monomer, photoinitiator, and/or other additives, exhibits an elastic modulus of at least about $10^5$ Pa, generally about $10^5$ Pa to about $10^9$ Pa, advantageously about $10^6$ Pa to about $10^8$ Pa.

Utilization of a photoactive monomer and a matrix precursor that polymerize by independent reactions provides a cured matrix substantially free of cross-reaction, i.e., the photoactive monomer remains substantially inert during the matrix cure of the replica molding patterning step. The resulting medium is capable of exhibiting desirable refractive index contrast due to the independence of the matrix from the photoactive monomer. Also, due to the independent reactions, there is no inhibition of subsequent polymerization of the photoactive monomer. Moreover, the compatibility of the matrix polymer and photopolymer tends to prevent large-scale (>100 nm) phase separation of the components, such large-scale phase separation typically leading to undesirable haziness or opacity. The medium of contains a three-dimensional crosslinked polymer matrix and one or more photoactive monomers. At least one photoactive monomer contains one or more moieties, excluding the monomer functional groups, that are substantially absent from the polymer matrix, i.e., it is possible to find a moiety in the photoactive monomer such that no more than 20% of all such moieties in the photopolymer medium are present, i.e., covalently bonded, in the matrix. The resulting independence between the host matrix and the monomer offers useful recording properties.

The matrix is a solid polymer formed in situ from a matrix precursor by a curing step (curing indicating a step of inducing reaction of the precursor to form the polymeric matrix). It is possible for the precursor to be one or more monomers, one or more oligomers, or a mixture of monomer and oligomer. In addition, it is possible for there to be greater than one type of precursor functional group, either on a single precursor molecule or in a group of precursor molecules. (Precursor functional groups are the group or groups on a precursor molecule that are the reaction sites for polymerization during matrix cure.) To promote mixing with the photoactive monomer, the precursor is advantageously liquid at some temperature between about −50° C. and about 80° C. Advantageously, the matrix polymerization is capable of being performed at room temperature. Also advantageously, the polymerization is capable of being performed in a time period less than 300 minutes, advantageously 5 to 200 minutes. The glass transition temperature ($T_g$) of the photopolymer medium is advantageously low enough to permit sufficient diffusion and chemical reaction of the photoactive monomer during a holographic recording process. Generally, the $T_g$ is not more than 50° C. above the temperature at which holographic recording is performed, which, for typical holographic recording, means a $T_g$ between about 80° C. and about −130° C. (as measured by conventional methods). It is also advantageous for the matrix to exhibit a three-dimensional network structure, as opposed to a linear structure, to provide the desired modulus discussed previously.

Examples of polymerization reactions contemplated for forming matrix polymers in the replica molding step include cationic epoxy polymerization, cationic vinyl ether polymerization, cationic alkenyl ether polymerization, cationic allene ether polymerization, cationic ketene acetal polymerization, epoxy-amine step polymerization, epoxy mercaptan step polymerization, unsaturated ester-amine step polymerization (via Michael addition), unsaturated ester-mercaptan step polymerization (via Michael addition), vinyl-silicon hydride step polymerization (hydrosilylation), isocyanate-hydroxyl step polymerization (urethane formation), and isocyanate-amine step polymerization (urea formation).

Several such reactions are enabled or accelerated by suitable catalysts. For example, cationic epoxy polymerization takes place rapidly at room temperature by use of BF3-based catalysts, other cationic polymerizations proceed in the presence of protons, epoxy-mercaptan reactions and Michael additions are accelerated by bases such as amines, hydrosilylation proceeds rapidly in the presence of transition metal catalysts such as platinum, and urethane and urea formation proceed rapidly when tin catalysts are employed. It is also possible to use photogenerated catalysts for matrix formation, provided that steps are taken to prevent polymerization of the photoactive monomer during the photogeneration.

The photoactive monomer is any monomer or monomers capable of undergoing photoinitiated polymerization, and which, in combination with a matrix material, meets the polymerization reaction and compatibility requirements. Suitable photoactive monomers include those which polymerize by a free-radical reaction, e.g., molecules containing ethylenic unsaturation such as acrylates, methacrylates, acrylamides, methacrylamides, styrene, substituted styrenes, vinyl naphthalene, substituted vinyl naphthalenes, and other vinyl derivatives. Free-radical copolymerizable pair systems such as vinyl ether mixed with maleate and thiol mixed with olefin are also suitable. It is also possible to use cationically polymerizable systems such as vinyl ethers, alkenyl ethers, allene ethers, ketene acetals, and epoxies. It is also possible for a single photoactive monomer molecule to contain more than one functional group.

In addition to the photoactive monomer, the photopolymer medium typically contains a photoinitiator (the photoinitiator and photoactive monomer being part of the overall photoimageable system). Direct light-induced polymerization of the photoactive monomer by exposure to light is often difficult, particularly as the thicknesses of the polymer material increases. The photoinitiator, upon exposure to relatively low levels of the recording light, chemically initiates the polymerization of the monomer, avoiding the need for direct light-induced polymerization of the monomer. The photoinitiator generally should offer a source of species that initiate polymerization of the particular photoactive monomer. Typically, 0.1 to 20 wt. % photoinitiator, based on the weight of the photoimageable system, provides desirable results.

A variety of photoinitiators known to those skilled in the art and available commercially are suitable. It is advantageous to use a photoinitiator that is sensitive to light in the visible part of the spectrum, particularly at wavelengths available from conventional laser sources, e.g., the blue and green lines of $Ar^+$ (458, 488, 514 nm) and He—Cd lasers (442 nm), the green line of frequency doubled YAG lasers (532 nm), and the red lines of He—Ne (633 nm) and $Kr^+$ lasers (647 and 676 nm). One advantageous free radical photoinitiator is bis(eta-5-2,4-cyclopentadien-1-yl)bis[2,6-difluoro-3-(1H-pyrrol-1-yl)phenyl]titanium, available commercially from Ciba as CGI-784. Another visible free-radical photoinitiator (which requires a co-initiator) is 5,7, diiodo-3-butoxy-6-fluorone, commercially available from Spectra Group Limited as H-Nu 470. Free-radical photoinitiators of dye-hydrogen donor systems are also possible. Examples of suitable dyes include eosin, rose bengal, erythrosine, and methylene blue, and suitable hydrogen donors include tertiary amines such as n-methyl diethanol amine. In the case of cationically polymerizable monomers, a cationic photoinitiator is used, such as a sulfonium salt or an iodonium salt. These cationic photoinitiator salts absorb predominantly in the UV portion of the spectrum, and are therefore typically sensitized with a dye to allow use of the visible portion of the spectrum. An example of an alternative visible cationic photoinitiator is (eta5-2,4-cyclopentadien-1-yl)(eta6-isopropylbenzene)-iron(II) hexafluorophosphate, available commercial from Ciba as Irgacure 261. It is also conceivable to use other additives in the photoimageable system, e.g., inert diffusing agents having relatively high or low refractive indices.

Advantageously, the matrix is a polymer formed by mercaptan-epoxy step polymerization, more advantageously a polymer formed by mercaptan-epoxy step polymerization having a polyether backbone. The polyether backbone offers desirable compatibility with several useful photoactive monomers, particularly vinyl aromatic compounds. Specifically, photoactive monomers selected from styrene, bromostyrene, divinyl benzene, and 4-methylthio-1-vinylnaphthalene (MTVN) have been found to be useful with matrix polymers formed by mercaptan-epoxy step polymerization and having a polyether backbone.

To be independent, the polymerization reactions for the matrix precursor and the photoactive monomer are selected such that: (a) the reactions proceed by different types of reaction intermediates, (b) neither the intermediate nor the conditions by which the matrix is polymerized will induce substantial polymerization of the photoactive monomer functional groups, and (c) neither the intermediate nor the conditions by which the matrix is polymerized will induce a non-polymerization reaction of the monomer functional groups that causes cross-reaction (between the monomer functional groups and the matrix polymer) or inhibits later polymerization of the monomer functional groups. According to item (a), if a matrix is polymerized by use of an ionic intermediate, it would be suitable to polymerize the photoactive monomer by use of a free radical reaction. In accordance with item (b), however, the ionic intermediate should not induce substantial polymerization of the photoactive monomer functional groups. Also in accordance with item (b), for example, one must be aware that a photoinitiated free radical matrix polymerization will typically induce a photoinitiated cationic polymerization of a photoactive monomer functional group. Thus, two otherwise independent reactions are not independent for purposes of the invention if both are driven by a single reaction condition. In accordance with item (c), for example, base-catalyzed matrix polymerization should not be performed when the photoactive monomer functional group undergoes a non-polymerization reaction in response to the base, even if polymerization of the monomer functional group is performed by an independent reaction. A specific example is that a base-catalyzed epoxy-mercaptan polymerization should not be used with an acrylate monomer because, although the acrylate is polymerized by a free radical reaction, the acrylate will react with the mercaptans under base catalysis, resulting in a cross-reaction.

Table I below illustrates some examples of matrix/photoactive monomer combinations where the matrix polymerization reaction and photoactive monomer polymerization are capable of being independent, and examples where the polymerizations interfere with each other. (Photoactive monomers are horizontal, and matrix polymers are vertical. "X" indicates cross-reaction or monomer polymerization during matrix polymerization. "O" indicates independent reactions. "I" indicates that the photoactive monomer polymerization is inhibited by the reagents or reaction that form the polymeric matrix, e.g., the photoactive monomer functional group is converted to a non-polymerizing group, or chemical species are present after the matrix cure that substantially slow the rate or yield of polymerization of the monomer functional groups.)

| Photoactive arrow right<br>Matrix arrow down | (Meth) acrylates | Styrene Derivatives | Vinyl Ethers |
|---|---|---|---|
| Epoxies | | | |
| Cationic Epoxy<br>X | ○ | ○ | X |
| Cationic Vinyl<br>X<br>Ethers | ○ | ○ | X |
| Epoxy (amine)<br>X | X | ○ | I |
| Epoxy (mercaptan)<br>X | X | ○ | I |
| Unsaturated ester<br>X<br>(amine) | X | ○ | I |
| Unsaturated ester<br>X<br>(mercaptan) | X | ○ | I |
| Hydrosilylation<br>○ | X | X | X |
| Urethane formation<br>X | ○ | ○ | ○ |

In the preferred embodiment, polymers are considered to be compatible if a blend of the polymers is characterized, in 90° light scattering, by a Rayleigh ratio (R90o) less than $7\times10^{-3}$ $cm^{-1}$. The Rayleigh ratio, R74, is a conventionally known property, and is defined as the energy scattered by a unit volume in the direction 0, per steradian, when a medium is illuminated with a unit intensity of unpolarized light, as discussed in M. Kerker, The Scattering of Light and Other Electromagnetic Radiation, Academic Press, San Diego, 1969. The light source used for the measurement is generally a laser having a wavelength in the visible part of the spectrum. Normally, the wavelength intended for use in writing holograms is used. The scattering measurements are made upon a photopolymer medium that has been flood exposed. The scattered light is collected at an angle of 90° from the incident light, typically by a photodetector. It is possible to place a narrowband filter, centered at the laser wavelength, in front of such a photodetector to block fluorescent light, although such a step is not required. The Rayleigh ratio is typically obtained by comparison to the energy scatter of a reference material having a known Rayleigh ratio.

Polymer blends which are considered to be miscible, e.g., according to conventional tests such as exhibition of a single glass transition temperature, will typically be compatible as well, i.e., miscibility is a subset of compatibility. Standard miscibility guidelines and tables are therefore useful in selecting a compatible blend. However, it is possible for polymer blends that are immiscible to be compatible according to the light scattering test above.

A polymer blend is generally considered to be miscible if the blend exhibits a single glass transition temperature, $T_g$, as measured by conventional methods. An immiscible blend will typically exhibit two glass transition temperatures corresponding to the $T_g$ values of the individual polymers. $T_g$ testing is most commonly performed by differential scanning calorimetry (DSC), which shows the $T_g$ as a step change in the heat flow (typically the ordinate). The reported $T_g$ is typically the temperature at which the ordinate reaches the mid-point between extrapolated baselines before and after the transition. It is also possible to use Dynamic Mechanical Analysis (DMA) to measure $T_g$. DMA measures the storage modulus of a material, which drops several orders of magnitude in the glass transition region. It is possible in certain cases for the polymers of a blend to have individual $T_g$ values that are close to each other. In such cases, conventional methods for resolving such overlapping $T_g$ should be used, such as discussed in Brinke et al., "The thermal characterization of multi-component systems by enthalpy relaxation," Thermochimica Acta., 238 (1994), at 75.

Matrix polymer and photopolymer that exhibit miscibility are capable of being selected in several ways. For example, several published compilations of miscible polymers are available, such as O. Olabisi et al., Polymer-Polymer Miscibility, Academic Press, New York, 1979; L. M. Robeson, MMI. Press Symp. Ser., 2, 177, 1982; L. A. Utracki, Polymer Alloys and Blends: Thermodynamics and Rheology, Hanser Publishers, Munich, 1989; and S. Krause in Polymer Handbook, J. Brandrup and E. H. Immergut, Eds., 3rd Ed., Wiley Interscience, New York, 1989, pp. VI 347–370, the disclosures of which are hereby incorporated by reference. Even if a particular polymer of interest is not found in such references, the approach specified allows determination of a compatible photopolymer medium by employing a control sample.

Determination of miscible or compatible blends is further aided by intermolecular interaction considerations that typically drive miscibility. For example, it is well known that polystyrene and poly(methylvinylether) are miscible because of an attractive interaction between the methyl ether group and the phenyl ring. It is therefore possible to promote miscibility, or at least compatibility, of two polymers by using a methyl ether group in one polymer and a phenyl group in the other polymer. It has also been demonstrated that immiscible polymers are capable of being made miscible by the incorporation of appropriate functional groups that can provide ionic interactions. (See Z. L. Zhou and A. Eisenberg, J. Polym. Sci., Polym. Phys. Ed., 21 (4), 595, 1983; R. Murali and A. Eisenberg, J. Polym. Sci., Part B: Polym. Phys., 26 (7), 1385, 1988; and A Natansohn et al., Makromol. Chem., Macromol. Symp., 16, 175, 1988.) For example, polyisoprene and polystyrene are immiscible. However, when polyisoprene is partially sulfonated (5%), and 4-vinyl pyridine is copolymerized with the polystyrene, the blend of these two functionalized polymers is miscible. It is contemplated that the ionic interaction between the sulfonated groups and the pyridine group (proton transfer) is the driving force that makes this blend miscible. Similarly, polystyrene and poly(ethyl acrylate), which are normally immiscible, have been made miscible by lightly sulfonating the polystyrene. (See R. E. Taylor-Smith and R. A. Register, Macromolecules, 26, 2802, 1993.) Charge-transfer has also been used to make miscible polymers that are otherwise immiscible. For example it has been demonstrated that, although poly(methyl acrylate) and poly(methyl methacrylate) are immiscible, blends in which the former is copolymerized with (N-ethylcarbazol-3-yl)methyl acrylate (electron donor) and the latter is copolymerized with 2-[(3,5-dinitrobenzoyl)oxy]ethyl methacrylate (electron acceptor) are miscible, provided the right amounts of donor and acceptor are used. (See M. C. Piton and A. Natansohn, Macromolecules, 28, 15, 1995.) Poly(methyl methacrylate) and polystyrene are also capable of being made miscible using the corresponding donor-acceptor co-monomers (See M. C. Piton and A. Natansohn, Macromolecules, 28, 1605, 1995).

Compatibility has also been promoted in otherwise incompatible polymers by incorporating reactive groups into the polymer matrix, where such groups are capable of reacting with the photoactive monomer during the holographic patterning step. Some of the photoactive monomer will thereby be grafted onto the matrix during recording. If there are enough of these grafts, it is possible to prevent or reduce phase separation during recording. However, too many grafts, e.g., more than 30% of monomers grafted to the matrix, will tend to undesirably reduce refractive index contrast.

In addition to selecting materials which polymerize by independent reactions and which, as polymers, are compatible with each other, it is advantageous to select materials to provide a high refractive index contrast, $\Delta n$, between the matrix polymer and the photopolymer, discussed in more detail below. Such contrast is desirable to increase the strength of photopatterned structures.

The multiply patterned photopolymer is formed by adequately supporting the photopolymer medium, such that molding and holographic writing is possible. Typically, fabrication of the multiply patterned photopolymer involves depositing the matrix precursor/photoimageable system mixture on a plate using a gasket to contain the mixture. The plate is typically glass, but it is also possible to use other materials transparent to the radiation used to write data, e.g., a plastic such as polycarbonate or poly(methyl methacrylate). It is possible to use spacers to maintain a desired thickness for the photopolymer medium. The mold master is brought into contact with the photorecording medium, which conforms with the mold pattern of the mold master. While the photorecording medium is in conformity with the mold master, a matrix cure is performed.

The photopolymer medium is also capable of being supported in other ways. For instance, it is conceivable to dispose the matrix precursor/photoimageable system mixture directly onto the surface of the mold master prior to matrix cure. More conventional polymer processing is also envisioned, e.g., closed mold formation. The medium of the invention is then capable of being used in a holographic system to photopattern additional optical articles such as discussed previously.

Multiply patterned photorecording mediums prepared utilizing the methods of this invention are useful in fabricating a variety of optical articles. In the present invention, photopolymers can be patterned using replica molding to fabricate optical waveguide structures. Such waveguide structures can be the basis for forming optical interferometers. The fabricated optical waveguides can be further processed by photopatterning in order to fabricate embedded diffractive gratings for optical articles such as filters, reflectors, multiplexers, and demultiplexers. The present invention allows for the easy processing of a photorecording medium to create both waveguides and embedded diffractive gratings, creating a multi-functional integrated optical device.

Having described the invention in terms of a preferred embodiment, it will be recognized by those skilled in the art that various molding and photopatterning techniques may be substituted for the configuration described above to achieve an equivalent result. For example, the embodiments discussed herein include descriptions of particular molding techniques. It will be apparent to those skilled in the art that modifications and variations of the preferred embodiment are possible, and that other molding techniques may be used to perform equivalent functions, all of which fall within the true spirit and scope of the invention as measured by the following claims.

The invention claimed is:

1. A method for forming an optical article comprising: providing a micromold having a pre-patterned surface structure;

disposing a photorecording medium comprising a matrix precursor and a photoactive monomer on a holder surface;

moving the micromold to the photorecording medium on the holder surface such that the pre-patterned surface structure contacts the photorecording medium, wherein the photorecording medium conforms to the pre-patterned surface structure of the micromold;

at least partially curing the photorecording medium adherent while the micromold pre-patterned surface structure contacts the photorecording medium;

further patterning the photorecording medium by irradiating the photorecording medium with laser light to polymerize the photoactive monomer.

2. The method of claim 1, wherein irradiating the photorecording medium with laser light to polymerize the photoactive monomer comprises recording regions of interference fringes of volume phase hologram diffraction gratings.

3. The method of claim 1, wherein the micromold pre-patterned surface structure forms an optical waveguide structure on the photorecording medium when the photorecording medium conforms to the pre-patterned surface structure of the micromold.

4. The method of claim 1, further comprising disposing an optical phase grating adjacent to the photorecording medium and applying the laser light through the optical phase grating to the photorecording medium.

5. The method of claim 4, wherein the optical phase grating comprises a surface relief structure fabricated in a high quality diffractive optic transparent to the laser beam.

6. The method of claim 1, further comprising interfering multiple optical laser beams through the photorecording medium.

7. The method of claim 1 wherein the resulting structure is an optical filter, multiplexer, demultiplexer, holographic lens, or other phase structure embedded within an optical waveguide.

8. The method of claim 1, wherein the polymer matrix comprises a polyether backbone.

9. The method of claim 1, wherein the photoactive monomer is selected from vinyl aromatic compounds.

10. The method of claim 1, wherein the photoactive monomer is at least one of styrene, bromostyrene, divinyl benzene, and 4-methylthio-1-vinylnaphth-alene.

11. The method of claim 1, wherein a photoinitiator is mixed with the matrix precursor and photoactive monomer.

12. The method of claim 1, further comprising removing the micromold prior to further patterning the photorecording medium by irradiating the photorecording medium with laser light.

13. The method of claim 1, wherein one or more photoactive monomers comprises a moiety, other than the monomer functional group, that is substantially absent from the polymer matrix.

* * * * *